(12) United States Patent
Pyo et al.

(10) Patent No.: US 12,507,357 B2
(45) Date of Patent: Dec. 23, 2025

(54) DISPLAY DEVICE

(71) Applicant: LG ELECTRONICS INC., Seoul (KR)

(72) Inventors: Jonggil Pyo, Seoul (KR); Seunggyu Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 3 days.

(21) Appl. No.: 18/687,735

(22) PCT Filed: Sep. 17, 2021

(86) PCT No.: PCT/KR2021/012878
§ 371 (c)(1),
(2) Date: Feb. 28, 2024

(87) PCT Pub. No.: WO2023/042943
PCT Pub. Date: Mar. 23, 2023

(65) Prior Publication Data
US 2024/0381551 A1    Nov. 14, 2024

(51) Int. Cl.
*H05K 5/02* (2006.01)
*H04N 5/645* (2006.01)
(52) U.S. Cl.
CPC ........... *H05K 5/0217* (2013.01); *H04N 5/645* (2013.01)
(58) Field of Classification Search
CPC ........ H05K 5/0217; H04N 5/645; H04N 5/64; G06F 1/16; G09F 9/30
See application file for complete search history.

(56) References Cited

U.S. PATENT DOCUMENTS

| | | | | |
|---|---|---|---|---|
| 10,410,549 | B1 * | 9/2019 | Kim | G06F 1/1652 |
| 10,534,402 | B1 * | 1/2020 | Kim | G06F 1/1652 |
| 11,194,361 | B1 * | 12/2021 | Cho | G06F 3/147 |
| 2007/0035671 | A1 * | 2/2007 | Ryu | H04N 5/64 |
| | | | | 348/794 |

(Continued)

FOREIGN PATENT DOCUMENTS

| | | | | |
|---|---|---|---|---|
| JP | 3121914 U | * | 6/2006 | ............ H04N 5/655 |
| JP | 2015093570 | | 5/2015 | |

(Continued)

OTHER PUBLICATIONS

KR-20190092980-A English translation (Year: 2019).*
PCT International Application No. PCT/KR2021/012878, International Search Report dated Jun. 9, 2022, 15 pages.

*Primary Examiner* — John R Schnurr
(74) *Attorney, Agent, or Firm* — LEE, HONG, DEGERMAN, KANG & WAIMEY (57) ABSTRACT

Provided is a display device comprising: a housing including a first opening formed at the top thereof; a display module passing through the first opening and including a first region positioned inside the housing and a second region positioned outside the housing; a driving unit for sliding the display module; and a control unit for controlling the driving unit so as to extend or reduce the second region, wherein the housing includes: a front cover positioned on the front surface of the display module; and a rear cover which is positioned on the rear surface of the display module and which is larger than the front cover with respect to the top side thereof.

17 Claims, 9 Drawing Sheets

(56) References Cited

U.S. PATENT DOCUMENTS

| | | | | |
|---|---|---|---|---|
| 2011/0132557 | A1* | 6/2011 | Kuroi | G03B 21/58 |
| | | | | 160/368.1 |
| 2012/0194750 | A1* | 8/2012 | Carr | H04R 1/028 |
| | | | | 348/E5.132 |
| 2016/0363960 | A1* | 12/2016 | Park | G09F 15/0062 |
| 2018/0160554 | A1* | 6/2018 | Kang | H05K 5/0247 |
| 2018/0342225 | A1* | 11/2018 | Yun | H04N 21/431 |
| 2019/0064883 | A1* | 2/2019 | Hong | H04N 21/4222 |
| 2019/0146557 | A1* | 5/2019 | Choi | G06F 3/04847 |
| | | | | 361/749 |
| 2019/0166328 | A1* | 5/2019 | Kim | H04N 5/642 |
| 2019/0198783 | A1* | 6/2019 | Kim | H10H 20/855 |
| 2019/0289251 | A1* | 9/2019 | Kim | H04N 5/642 |
| 2019/0355328 | A1* | 11/2019 | Suk | G09G 3/035 |
| 2020/0077194 | A1* | 3/2020 | Kim | H04R 9/025 |
| 2020/0304747 | A1* | 9/2020 | Kim | H04N 5/642 |
| 2021/0208552 | A1* | 7/2021 | Choi | G06F 1/1656 |
| 2022/0044600 | A1* | 2/2022 | Jeon | G06F 1/1601 |
| 2023/0209746 | A1* | 6/2023 | Yoon | H05K 5/0217 |
| 2023/0213978 | A1* | 7/2023 | Kim | H04M 1/72448 |
| | | | | 455/566 |
| 2023/0308532 | A1* | 9/2023 | Kim | G06F 3/14 |

FOREIGN PATENT DOCUMENTS

| | | | | | |
|---|---|---|---|---|---|
| KR | 20110038560 | A | * | 4/2011 | G09F 9/30 |
| KR | 20190092980 | A | * | 8/2019 | G09F 15/0056 |
| KR | 1020190129024 | | | 11/2019 | |
| KR | 102224096 | | | 3/2021 | |
| KR | 102224097 | | | 3/2021 | |
| KR | 102252777 | | | 5/2021 | |
| KR | 102528883 | B1 | * | 5/2023 | G09F 15/0056 |
| KR | 20230098967 | A | * | 7/2023 | H05K 5/13 |
| WO | WO-2023128017 | A1 | * | 7/2023 | H04N 5/64 |

\* cited by examiner

DISPLAY DEVICE

CROSS-REFERENCE TO RELATED APPLICATION(S)

This application is the National Stage filing under 35 U.S.C. 371 of International Application No. PCT/KR2021/012878, filed on Sep. 17, 2021, the contents of which are all incorporated by reference herein in its entirety.

TECHNICAL FIELD

The disclosure relates to a display device including a slidable display module.

BACKGROUND ART

With growth of information society, demand for various display devices has increased. In order to satisfy such demand, in recent years, a liquid crystal display (LCD), a field emission display (FED), a plasma display panel (PDP), and an electroluminescent device have been developed as display devices.

A liquid crystal panel of the liquid crystal display includes a liquid crystal layer and a TFT substrate and a color filter substrate opposite each other in the state in which the liquid crystal layer is interposed therebetween, wherein a picture is displayed using light provided from a backlight unit.

An active matrix type organic light-emitting display has come onto the market as an example of the electroluminescent device. Since the organic light-emitting display is self-emissive, the organic light-emitting display has no backlight, compared to the liquid crystal display, and has merits in terms of response time and viewing angle, and therefore the organic light-emitting display has attracted attention as a next-generation display.

As display devices have become thinner in recent years, there has been an increasing demand for display devices capable of increasing convenience and providing an optimized video viewing environment for each home, beyond the classic type of display devices.

In addition, there is a growing need for a display device designed to blend in with surrounding furniture, when not being used for video viewing.

DETAILED DESCRIPTION OF THE INVENTION

Technical Problem

An object of the disclosure is to provide a display device including a slidable display module.

Technical Solution

Provided is a display device including: a housing including a first opening formed on top thereof; a display module passing through the first opening, and including a first area located inside the housing and a second area located outside the housing; a driver sliding the display module; and a controller controlling the driver to extend or contract the second area. The housing includes a front cover located on a front surface of the display module; and a rear cover located on a rear surface of the display module and larger in size upwardly than the front cover.

The display module may include: a display panel on which an image is output; a flexible substrate extending from a bottom of the display panel and bent in a rear direction; and a display controller connected to the flexible substrate and located under a rear surface of the display panel, and the rear cover may have a size corresponding to heights of the flexible substrate and the display controller located under the display module.

The display module may further include a back plate covering the rear surface of the display panel.

The display device may have one state of: a basic mode in which the second area of the display module has a size corresponding to a size difference between the rear cover and the front cover; and an extended mode in which the display module moves upward and the second area increases in area than in the basic mode.

The front cover may include at least one second opening located on a front surface thereof, and the controller may control the display module to emit light or an image through the second opening in the basic mode.

The driver may include: a motor providing a rotational force; a lead screw rotating by receiving the rotational force of the motor; a nut moving upward and downward along the lead screw; and a moving bracket fastening the nut to the display module.

The driver may further include a guide shaft located in a lateral direction of the lead screw, extending parallel to the lead screw, and penetrating the nut.

The display device may include: a support frame extending in a vertical direction; and a moving block coupled with the rear surface of the display module and moving upward and downward along the support frame. The moving bracket may be fastened to the moving block.

A plurality of moving blocks and a plurality of support frames may be arranged in a horizontal direction, and support frames located at both horizontal ends of the display module may form side surfaces of the housing.

The support frame may include: a first frame parallel to the display module and having an end fastened to the moving block; and a second frame perpendicular to the first frame.

The display device may further include: a horizontal frame coupled with a top end of the support frame; and a lower frame forming a bottom surface of the housing, and coupled with a bottom end of the support frame.

The housing may include a side cover located around a periphery of a front surface of the rear cover and forming a side exterior of the housing.

The display device may further include an audio output unit located between the front cover and the display module, and the display device may include a second opening located on a front surface of the front cover and allowing sound output from the audio output unit to pass therethrough.

Advantageous Effects

A display device of the disclosure may be used with a display module extended to the outside only when needed, thereby minimizing the exposure of a black screen on the display module to the outside at normal times.

In addition, there is a structure supporting the rear surface of the display module in an extended state of the display module, thereby preventing breakage of the display module.

Effects obtainable from the disclosure may be non-limited by the above-mentioned effects. And, other unmentioned effects can be clearly understood from the following descrip-

MODE FOR CARRYING OUT THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Meanwhile, an image display device described in this specification is, for example, an intelligent image display device having a computer supporting function in addition to a broadcast reception function, wherein an Internet function may be added while the broadcast reception function is devotedly performed, whereby an interface that is more conveniently used, such as a handwriting type input device, a touchscreen, or a space remote control, may be provided. In addition, the image display device may be connected to the Internet or a computer through support of a wired or wireless Internet function, whereby various functions, such as e-mail, web browsing, banking, or gaming, may be executed. For such various functions, a standardized general-purpose OS may be used.

In the image display device described in the disclosure, therefore, various applications may be freely added or deleted, for example, on a general-purpose OS kernel, whereby various user friendly functions may be executed. More specifically, the image display device may be a network TV, an Hbb TV, or a smart TV, and is applicable to a smartphone depending on circumstances.

Figure 1:
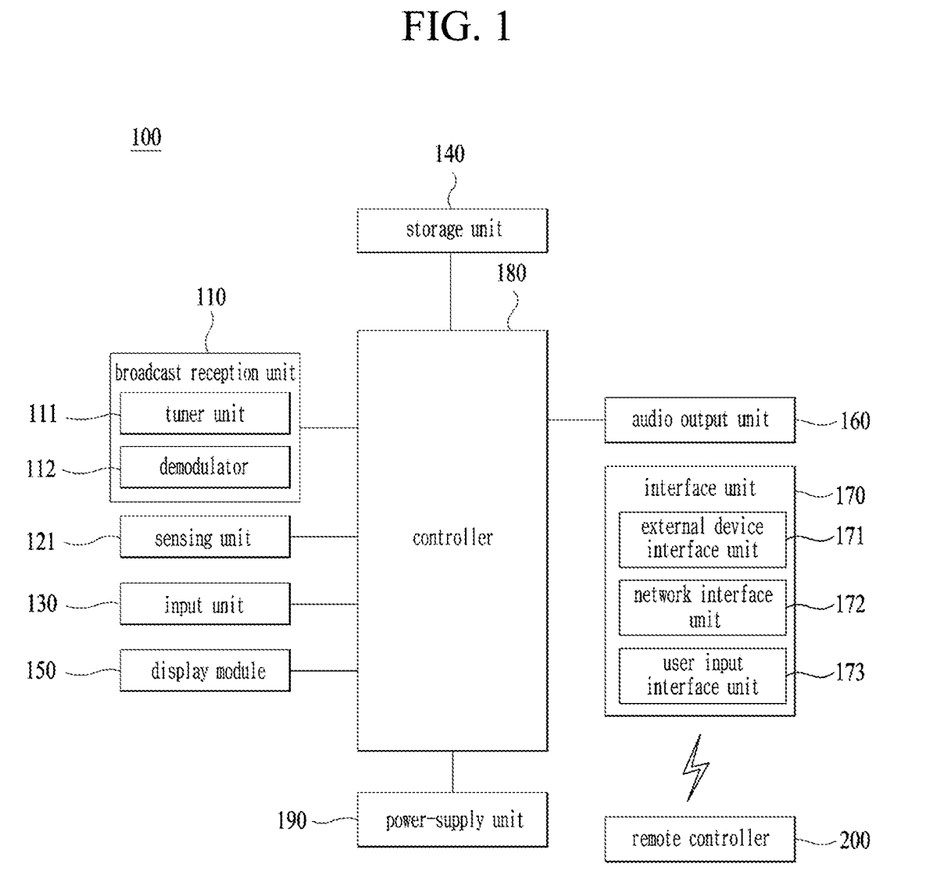
FIG. 1 is a block diagram illustrating components of a display device according to the disclosure.

FIG. 1 is a block diagram illustrating components of a display device 100. The display device 100 may include a broadcast reception unit 110, an external device interface unit 171, a network interface unit 172, a storage unit 140, a user input interface unit 173, an input unit 130, a controller 180, a display module 150, an audio output unit 160, and/or a power supply unit 190.

The broadcast reception unit 110 may include a tuner unit 111 and a demodulation unit 112.

Unlike the figure, on the other hand, the display device 100 may include only the external device interface unit 171 and the network interface unit 172, among the broadcast reception unit 110, the external device interface unit 171, and the network interface unit 172. That is, the display device 100 may not include the broadcast reception unit 110.

The tuner unit 111 may select a broadcast signal corresponding to a channel selected by a user or any one of all pre-stored channels, among broadcast signals received through an antenna (not shown) or a cable (not shown). The tuner unit 111 may convert the selected broadcast signal into an intermediate frequency signal or a baseband video or audio signal.

For example, when the selected broadcast signal is a digital broadcast signal, the tuner unit 111 may convert the broadcast signal into a digital IF (DIF) signal, and when the selected broadcast signal is an analog broadcast signal, the tuner unit 111 may convert the broadcast signal into an analog baseband video or audio (CVBS/SIF) signal. That is, the tuner unit 111 may process the digital broadcast signal or the analog broadcast signal. The analog baseband video or audio (CVBS/SIF) signal output from the tuner unit 111 may be directly input to the controller 180.

Meanwhile, the tuner unit 111 may sequentially select broadcast signals of all broadcast channels stored through a channel memory function, among received broadcast signals, and may convert each of the selected broadcast signals into an intermediate frequency signal or a baseband video or audio signal.

Meanwhile, the tuner unit 111 may include a plurality of tuners in order to receive broadcast signals of a plurality of channels. Alternatively, a single tuner may simultaneously receive broadcast signals of a plurality of channels.

The demodulation unit 112 may receive the digital IF (DIF) signal converted by the tuner unit 111, and may perform demodulation. After performing demodulation and channel decryption, the demodulation unit 112 may output a stream signal (TS). At this time, the stream signal may be a multiplexed image, audio, or data signal.

The stream signal output from the demodulation unit 112 may be input to the controller 180. After performing demultiplexing and image/audio signal processing, the controller 180 may output an image through the display module 150, and may output audio through the audio output unit 160.

The sensing unit 120 is a device configured to sense change inside or outside the display device 100. For example, the sensing unit 120 may include at least one of a proximity sensor, an illumination sensor, a touch sensor, an infrared (IR) sensor, an ultrasonic sensor, an optical sensor (e.g. a camera), an audio sensor (e.g. a microphone), a battery gauge, and an environmental sensor (e.g. a hygrometer or a thermometer).

The controller 180 may check the state of the display device 100 based on information collected by the sensing unit, and when a problem occurs, may inform a user of the same or may solve the problem, whereby the controller may perform control such that the display device is maintained in the best state.

In addition, the controller may differently control the content, quality, and size of an image provided to the display module 150 based on a viewer or ambient light sensed by the sensing unit in order to provide the optimum viewing environment. With progress of a smart TV, a large number of functions have been loaded in the display device, and the sensing unit 20 has also been increased in number.

The input unit 130 may be provided at one side of a main body of the display device 100. For example, the input unit 130 may include a touchpad or a physical button. The input unit 130 may receive various user commands related to the operation of the display device 100, and may transmit control signals corresponding to the received commands to the controller 180.

With a decrease in size of a bezel of the display device 100, many display devices 100 have been configured such that the number of physical button type input units 130 exposed to the outside is minimized in recent years. Instead, a minimum number of physical buttons is located at the rear surface or the side surface of the display device, and the display device may receive user input through the touchpad or the user input interface unit 173, a description of which will follow, using a remote controller 200.

The storage unit 140 may store programs for signal processing and control in the controller 180, and may store a processed image, audio, or data signal. For example, the storage unit 140 may store application programs designed to execute various tasks that can be processed by the controller 180, and may selectively provide some of the stored application programs in response to request of the controller 180.

Programs stored in the storage unit 140 are not particularly restricted as long as the programs can be executed by the controller 180. The storage unit 140 may temporarily store an image, audio, or data signal received from an external device through the external device interface unit 171. The storage unit 140 may store information about a predetermined broadcast channel through a channel memory function, such as a channel map.

FIG. 1 shows an embodiment in which the storage unit 140 and the controller 180 are separately provided; however, the disclosure is not limited thereto. The storage unit 140 may be included in the controller 180.

The storage unit 140 may include at least one of a volatile memory (e.g. DRAM, SRAM, or SDRAM), a nonvolatile memory (e.g. flash memory), a hard disk drive (HDD), and a solid-state drive (SSD). The display module 150 may convert an image signal, a data signal, an OSD signal, and a control signal processed by the controller 180 or an image signal, a data signal, and a control signal received from the interface unit 171 to generate a driving signal. The display module 150 may include a display panel 181 having a plurality of pixels.

Each of the plurality of pixels in the display panel may include RGB subpixels. Alternatively, each of the plurality of pixels in the display panel may include RGBW subpixels. The display module 150 may convert an image signal, a data signal, an OSD signal, and a control signal processed by the controller 180 to generate a driving signal for the plurality of pixels.

A plasma display panel (PDP), a liquid crystal display (LCD), an organic light-emitting diode (OLED), or a flexible display may be used as the display module 150, and a 3D display may also be used. The 3D display 130 may be classified as a non-glasses type display or a glasses type display.

Meanwhile, the display module 150 may be constituted by a touchscreen, whereby an input device may also be used in addition to an output device.

The audio output unit 160 receives an audio signal processed by the controller 180 and outputs the same as audio.

The interface unit 170 serves as a path to various kinds of external devices connected to the display device 100. The interface unit may include a wireless system using an antenna as well as a wired system configured to transmit and receive data through a cable.

The interface unit 170 may include at least one of a wired/wireless headset port, an external charger port, a wired/wireless data port, a memory card port, a port for connection with a device having an identification module, an audio input/output (I/O) port, a video input/output (I/O) port, and an earphone port.

The broadcast reception unit 110 may be included as an example of the wireless system, and a mobile communication signal, a short-range communication signal, and a wireless Internet signal as well as a broadcast signal may be included.

The external device interface unit 171 may transmit or receive data to or from a connected external device. To this end, the external device interface unit 171 may include an A/V input and output unit (not shown).

The external device interface unit 171 may be connected to an external device, such as a digital versatile disc (DVD) player, a Blu-ray player, a game console, a camera, a camcorder, a computer (laptop computer), or a set-top box, in wired/wireless manner, and may perform input/output operation for the external device.

In addition, the external device interface unit 171 may establish a communication network with various remote controllers 200 in order to receive a control signal related to the operation of the display device 100 from each remote controller 200 or to transmit data related to the operation of the display device 100 to each remote controller 200.

The external device interface unit 171 may include a wireless communication unit (not shown) for short-range wireless communication with another electronic device. The external device interface unit 171 may exchange data with a mobile terminal adjacent thereto through the wireless communication unit (not shown). Particularly, in a mirroring mode, the external device interface unit 171 may receive device information, information of an application that is executed, and an image of the application from the mobile terminal.

The network interface unit 172 may provide an interface for connection of the display device 100 with a wired/ wireless network including the Internet. For example, the network interface unit 172 may receive content or data provided by an Internet or content provider or a network operator through the network. Meanwhile, the network interface unit 172 may include a communication module (not shown) for connection with the wired/wireless network.

The external device interface unit 171 and/or the network interface unit 172 may include a communication module for short-range communication, such as Wi-Fi, Bluetooth, Bluetooth Low Energy (BLE), ZigBee, or Near Field Communication (NFC), or a communication module for cellular communication, such as Long-Term Evolution (LTE), LTE Advance (LTE-A), Code Division Multiple Access (CDMA), Wideband CDMA (WCDMA), Universal Mobile Telecommunications System (UMTS), or Wireless Broadband (WiBro).

The user input interface unit 173 may transmit a user input signal to the controller 180, or may transmit a signal from the controller 180 to a user. For example, the user input interface unit may transmit/receive a user input signal, such as power on/off, channel selection, or screen setting, to/from the remote controller 200, may transmit a user input signal, such as a power key, a channel key, a volume key, or a setting value, input from a local key (not shown) to the controller 180, may transmit a user input signal input from a sensor unit (not shown) configured to sense user gesture to the controller 180, or may transmit a signal from the controller 180 to the sensor unit.

The controller 180 may include at least one processor, and may control the overall operation of the display device 100 using the processor included therein. Here, the processor may be a general processor, such as a central processing unit (CPU). Of course, the processor may be a dedicated device, such as an ASIC, or another hardware-based processor.

The controller 180 may demultiplex a stream input through the tuner unit 111, the demodulation unit 112, the external device interface unit 171, or the network interface unit 172, or may process demultiplexed signals to generate and output a signal for image or audio output.

An image signal processed by the controller 180 may be input to the display module 150, which may display an image corresponding to the image signal. In addition, the image signal processed by the controller 180 may be input to an external output device through the external device interface unit 171.

An audio signal processed by the controller 180 may be output through the audio output unit 160. In addition, the audio signal processed by the controller 180 may be input to an external output device through the external device interface unit 171. Although not shown in FIG. 2, the controller 180 may include a demultiplexing unit and an image processing unit, which will be described below with reference to FIG. 3.

Further, the controller 180 may control the overall operation of the display device 100. For example, the controller 180 may control the tuner unit 111 such that a broadcast corresponding to a channel selected by a user or a pre-stored channel is tuned.

In addition, the controller 180 may control the display device 100 according to a user command input through the user input interface unit 173 or an internal program. Meanwhile, the controller 180 may control the display module 150 to display an image. At this time, the image displayed on the display module 150 may be a still image or video, or may be a 2D image or a 3D image.

Meanwhile, the controller 180 may perform control such that a predetermined 2D object is displayed in an image displayed on the display module 150. For example, the object may be at least one of a connected web screen (newspaper or magazine), an electronic program guide (EPG), various menus, a widget, an icon, a still image, video, and text.

Meanwhile, the controller 180 may modulate and/or demodulate a signal using an amplitude shift keying (ASK) method. Here, the amplitude shift keying (ASK) method may be a method of changing the amplitude of a carrier depending on a data value to modulate a signal or restoring an analog signal to a digital data value depending on the amplitude of a carrier.

For example, the controller 180 may modulate an image signal using the amplitude shift keying (ASK) method, and may transmit the modulated image signal through a wireless communication module.

For example, the controller 180 may demodulate and process an image signal received through the wireless communication module using the amplitude shift keying (ASK) method.

As a result, the display device 100 may easily transmit and receive a signal to and from another image display device disposed adjacent thereto without using a unique identifier, such as a media access control (MAC) address, or a complicated communication protocol, such as TCP/IP.

Meanwhile, the display device 100 may further include a photographing unit (not shown). The photographing unit may photograph a user. The photographing unit may be implemented by one camera; however, the disclosure is not limited thereto. The photographing unit may be implemented by a plurality of cameras. Meanwhile, the photographing unit may be embedded in the display device 100 above the display module 150, or may be separately disposed. Image information photographed by the photographing unit may be input to the controller 180.

The controller 180 may recognize the location of a user based on an image captured by the photographing unit. For example, the controller 180 may recognize the distance between the user and the display device 100 (z-axis coordinate). Further, the controller 180 may recognize an x-axis coordinate and a y-axis coordinate in the display module 150 corresponding to the location of the user.

The controller 180 may sense user gesture based on the image captured by the photographing unit, a signal sensed by the sensor unit, or a combination thereof.

The power supply unit 190 may supply power to the components of the display device 100. In particular, the power supply unit may supply power to the controller 180, which may be implemented in the form of a system on chip (SOC), the display module 150 for image display, and the audio output unit 160 for audio output.

Specifically, the power supply unit 190 may include an AC/DC converter (not shown) configured to convert AC power into DC power and a DC/DC converter (not shown) configured to convert the level of the DC power.

Meanwhile, the power supply unit 190 serves to distribute power supplied from the outside to the respective components of the display device. The power supply unit 190 may be directly connected to an external power supply in order to supply AC power, or may include a battery so as to be used by charging.

In the former case, a cable is used, and the power supply unit is difficult to move or the movement range of the power supply unit is limited. In the latter case, the power supply unit is free to move, but the weight of the power supply unit is increased in proportion to the weight of the battery, the volume of the power supply unit is increased, and, for charging, the power supply unit must be directly connected to a power cable or must be coupled to a charging holder (not shown) that supplies power for a predetermined time.

The charging holder may be connected to the display device through a terminal exposed to the outside, or the battery mounted in the power supply unit may be charged in a wireless manner when the power supply unit approaches the charging holder.

The remote controller 200 may transmit user input to the user input interface unit 173. To this end, the remote controller 200 may use Bluetooth communication, radio frequency (RF) communication, infrared radiation communication, ultra-wideband (UWB) communication, or ZigBee communication. In addition, the remote controller 200 may receive an image, audio, or data signal output from the user input interface unit 173 so as to be displayed thereon or audibly output therefrom.

Meanwhile, the display device 100 may be a stationary or movable digital broadcast receiver capable of receiving a digital broadcast.

Meanwhile, the block diagram of the display device 100 shown in FIG. 1 is for an embodiment of the disclosure, and elements of the block diagram may be integrated, added, or omitted depending on specifications of an actually implemented display device 100.

That is, two or more elements may be integrated into one element, or one element may be divided into two or more elements, as needed. In addition, the function performed by each block is for describing the embodiment of the disclosure, and the specific operations and components thereof do not limit the scope of rights of the disclosure.

Figure 2:
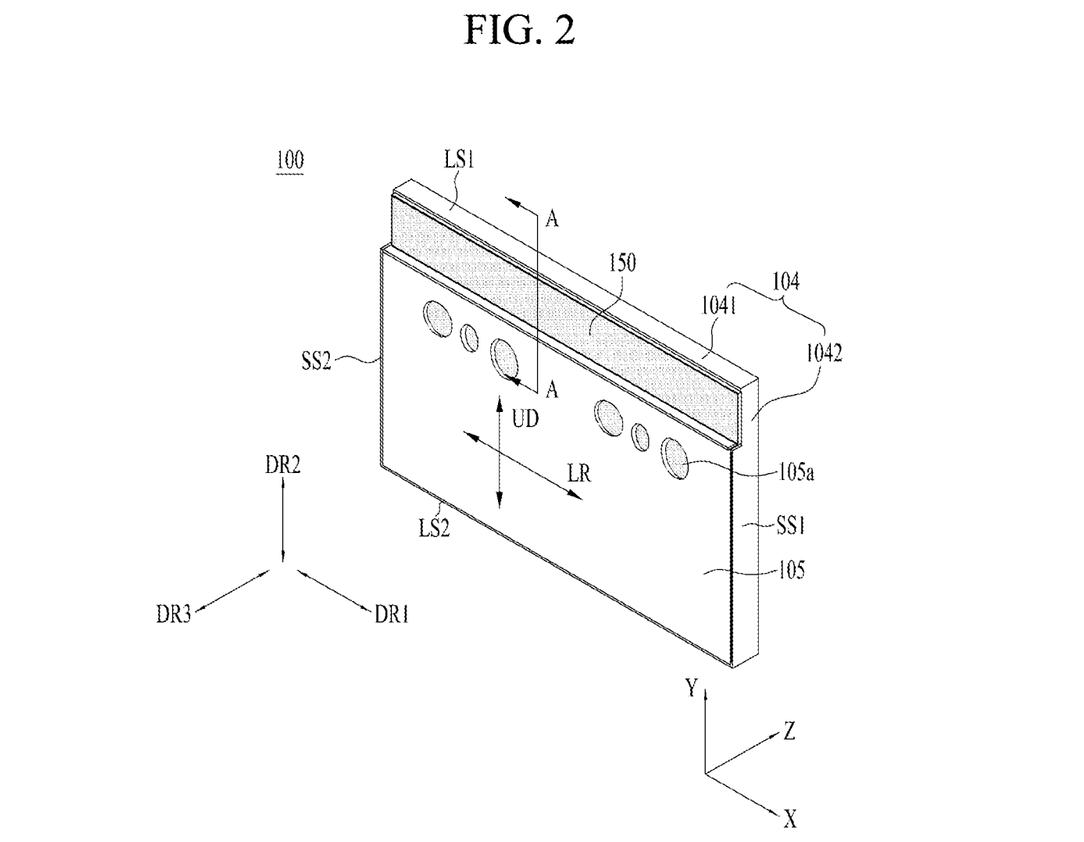
FIGS. 2 and 3 are perspective views illustrating an example of the display device according to the disclosure.
Figure 3:
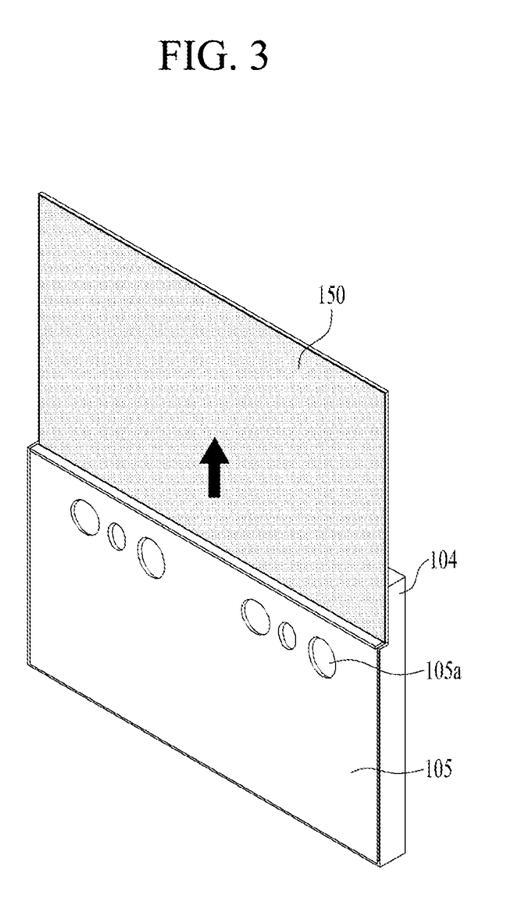

FIGS. 2 and 3 are front perspective views showing an example of the display device.

Referring to FIG. 2, the display device 100 may have a rectangular shape including a first long side LS1, a second long side LS2 opposite the first long side LS1, a first short side SS1 adjacent to the first long side LS1 and the second long side LS2, and a second short side SS2 opposite the first short side SS1.

Here, the area of the first short side SS1 may be referred to as a first side area, the area of the second short side SS2 may be referred to as a second side area opposite the first side area, the area of the first long side LS1 may be referred to as a third side area adjacent to the first side area and the second side area and located between the first side area and the second side area, and the area of the second long side LS2 may be referred to as a fourth side area adjacent to the first side area and the second side area, located between the first side area and the second side area, and opposite the third side area.

In addition, the lengths of the first and second long sides LS1 and LS2 are shown and described as being greater than the lengths of the first and second short sides SS1 and SS2, for convenience of description; however, the lengths of the first and second long sides LS1 and LS2 may be approximately equal to the lengths of the first and second short sides SS1 and SS2.

Also, in the following description, a first direction DR1 may be a direction parallel to the long sides LS1 and LS2 of the display device 100, and a second direction DR2 may be a direction parallel to the short sides SS1 and SS2 of the display device 100. A third direction DR3 may be a direction perpendicular to the first direction DR1 and/or the second direction DR2.

From a different point of view, the side of the display device 100 on which a picture is displayed may be referred to as a front side or a front surface. When the display device 100 displays the picture, the side of the display device 100 from which the picture cannot be viewed may be referred to as a rear side or a rear surface. When viewing the display device 100 from the front side or the front surface, the side of the first long side LS1 may be referred to as an upper side or an upper surface. In the same manner, the side of the second long side LS2 may be referred to as a lower side or a lower surface. In the same manner, the side of the first short side SS1 may be referred to as a right side or a right surface, and the side of the second short side SS2 may be referred to as a left side or a left surface.

In addition, the first long side LS1, the second long side LS2, the first short side SS1, and the second short side SS2 may be referred to edges 351 of the display device 100. In addition, points at which the first long side LS1, the second long side LS2, the first short side SS1, and the second short side SS2 are joined to each other may be referred to as corners. Here, a direction from the first short side SS1 to the second short side SS2 or a direction from the second short side SS2 to the first short side SS1 may be referred to as a leftward-rightward direction LR. A direction from the first long side LS1 to the second long side LS2 or a direction from the second long side LS2 to the first long side LS1 may be referred to as a vertical direction UD.

The display device includes the display module 150 occupying most of the area of the front surface of the display module 150, and a housing 102, 104, and 105 packaging the display module 150, while covering the rear surface and side surfaces of the display module 150.

In recent years, the display device 100 has used a flexible display module 150, such as light-emitting diodes (LED) or organic light-emitting diodes (OLED), in order to implement a curved screen.

Light is supplied to an LCD, which was mainly used conventionally, through a backlight unit, since the LCD is not self-emissive. The backlight unit is a device that supplies light emitted from a light source to a liquid crystal uniformly located in front thereof. As the backlight unit has been gradually thinned, a thin LCD has been implemented. However, it is difficult to implement the backlight unit using a flexible material. If the backlight unit is curved, it is difficult to supply uniform light to the liquid crystal, whereby the brightness of a screen is changed.

In contrast, the LED or the OLED may be implemented so as to be curved, since an element constituting each pixel is self-emissive, and therefore no backlight unit is used. In addition, since each element is self-emissive, the brightness of the element is not affected even though the positional relationship between adjacent elements is changed, and therefore it is possible to implement a curved display module 150 using the LED or the OLED.

An organic light-emitting diode (OLED) panel appeared in earnest in mid 2010 and has rapidly replaced the LCD in the small- or medium-sized display market. The OLED is a display manufactured using a self-emissive phenomenon of an organic compound in which the organic compound emits light when current flows in the organic compound. The response time of the OLED is shorter than the response time of the LCD, and therefore afterimages hardly appear when video is implemented.

The OLED is an emissive display product that uses three fluorescent organic compounds having a self-emissive function, such as red, green, and blue fluorescent organic compounds and that uses a phenomenon in which electrons injected at a negative electrode and a positive electrode and particles having positive charges are combined in the organic compounds to emit light, and therefore a backlight unit, which deteriorates color, is not needed.

A light-emitting diode (LED) panel is based on technology of using one LED element as one pixel. Since it is possible to reduce the size of the LED element, compared to a conventional device, it is possible to implement a curved display module 150. The conventional device, which is called an LED TV, uses the LED as a light source of a backlight unit that supplies light to the LCD, and therefore the LED does not constitute a screen.

The display module includes a display panel and a coupling magnet, a first power supply unit, and a first signal module located at a rear surface of the display panel. The display panel may include a plurality of pixels R, G, and B. The plurality of pixels R, G, and B may be formed at intersections between a plurality of data lines and a plurality of gate lines. The plurality of pixels R, G, and B may be disposed or arranged in a matrix form.

For example, the plurality of pixels R, G, and B may include a red subpixel 'R', a green subpixel 'G', and a blue subpixel 'B'. The plurality of pixels R, G, and B may include a white subpixel 'W'.

The side of the display module 150 on which a picture is displayed may be referred to as a front side or a front surface. When the display module 150 displays the picture, the side of the display module 150 from which the picture cannot be viewed may be referred to as a rear side or a rear surface.

In the display device 100 of the disclosure, the display module 150 is movable upward and downward, so that the size of a screen on the display module 150, which is exposed to the outside, may vary. FIG. 2 illustrates a basic mode in which the exposure of the display module 150 is minimized, and FIG. 3 illustrates an extended mode in which the exposure of the display module 150 is maximized. The display module 150 may be switched from the basic mode to the extended mode, while being extended outward in a stepwise manner.

For convenience of description, a screen located inside the housing 102, 104, and 105 is referred to as a first area, and a screen exposed to the outside is referred to as a second area. The sizes of the first area and the second area are variable.

In the basic mode, the first area is maximized and the second area is minimized in size, whereas in the extended mode, the second area is maximized in size.

The display module 150 may include the second area exposed to the outside even in the basic mode, and a rear cover 102 located in a rear direction may be formed larger than the front cover 105 located in a front direction, in correspondence with the size of the second area exposed in the basic mode. That is, the size of the second area in the basic mode may correspond to the difference between the sizes of the front cover 105 and the rear cover 102.

When the sizes of the front cover 105 and the rear cover 102 are different, it is possible to secure a supporting force supporting the display module 150 which has been extended upward, and at the same time, to make the most of the area of the front surface. When the sizes of the front cover 105 and the rear cover 102 are equal, a lower space of the display module 150 may not be utilized, resulting in reduction of the size an actual available screen.

For example, when the height of the front cover 105 is 60 cm and the rear cover 102 is 70 cm, the display module 150 may have a size corresponding to the size of the rear cover 102. Therefore, a 70-cm display module 150 may be mounted, and the second area may also be extended to correspond to 70 cm in the extended mode. Even if most of the display module 150 is exposed to the outside of the front cover 105, the rear cover 102 may support the display module 150, thereby allowing utilization of the entire area of the display module 150.

On the other hand, when the heights of the front cover 105 and the rear cover 102 are equally 60 cm, the maximum size of the display module 150 is 60 cm, and even if the display module 150 is extended, about 10 cm of the display module 150 should be located inside the housing, in consideration of a supporting force. Therefore, the actual available screen size is reduced to 50 cm.

When the heights of the front cover 105 and the rear cover 102 are set to 70 cm, it is possible to set the size of the display module 150 to 70 cm. However, the entire display module 150 is not allowed to be exposed to the outside, and thus the actual available screen size is only 60 cm.

To allow the display device 100 with the front cover 105 and the rear cover 102 of the same size to obtain a screen of 70 cm in the extended mode, the size of the housing should be 80 cm. In this case, the display device 100 is higher than the eye level of the user while the user sits on the sofa, which causes the user to feel uncomfortable.

Accordingly, when the rear cover 102 is larger than the front cover 105 as in the disclosure, a screen larger than the size of the front cover 105 may be advantageously provided.

The housing 105, 104, and 102 forming the exterior of the display device 100 may include the front cover 105 located on the front surface thereof, the rear cover 102 located on the rear surface thereof, and a side cover 104 forming the side surfaces thereof. Because the sizes of the front cover 105 and the rear cover 102 are different, a step is formed between them, and a first opening may be located at a position where the step is formed, to allow insertion and extension of the display module 150 therethrough.

When the display module 150 is fully inserted inward, the first opening may be exposed. However, the display module 150 of the disclosure is kept inserted in the first opening, which may minimize the introduction of a foreign material through the first opening.

Because the display module of the disclosure is insertable into or extendable from the housing, exposure of a black screen to the outside may be prevented by minimizing the second area, when the display module 150 is not in use (the basic mode).

In the basic mode, environmental information such as a clock, temperature, and humidity may be output to the second area exposed at the top, so that the user may easily identify the information. Additionally, when a notification occurs on a linked mobile terminal or home appliance, an icon indicating the notification may be output.

When a user-specified alarm occurs or an important notification occurs, the second area may be extended to provide sufficient information to the user. The user may easily recognize that a notification has occurred through movement of the display module 150.

The front cover 105 may include a second opening 105*a* on the front surface, as illustrated in FIGS. 2 and 3. As illustrated in FIG. 2, the second opening may be large enough to output information therethrough or create a lighting effect through a fine hole.

Figure 4:
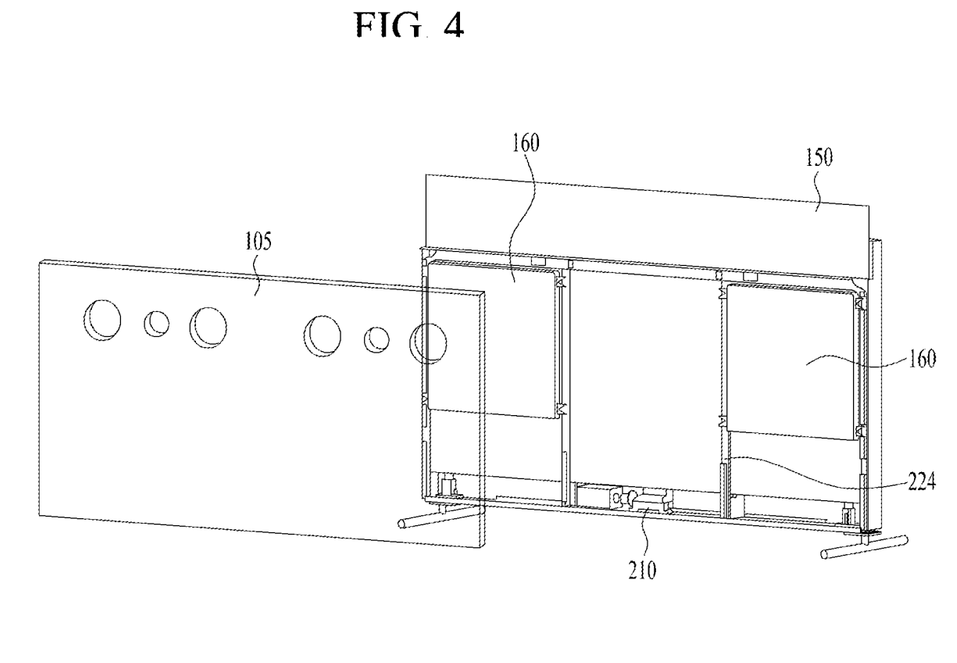
FIG. 4 is an exploded view illustrating a cross-section of the display device according to the disclosure, taken along line A-A of FIG. 2.

FIG. 4 is a front view illustrating the display device 100 with the front cover 105 removed therefrom according to the disclosure. As illustrated in FIG. 4, the audio output unit 160 may be disposed on the front surface of the display module 150 to output sound through the second opening 105*a*.

As the thickness of the display device 100 has decreased in recent years, there is a tendency to use a separate audio output device such as a sound bar or a home theater. However, the separate audio output device takes up indoor space, and it is difficult for the user to connect the separate audio output device, causing inconvenience during use.

Because an audio output unit located in the rear direction of the display device 100 is opposite to the user, sound output efficiency decreases. However, when the audio output unit is disposed to face forward as in the disclosure, sound quality may be improved.

A front frame 224 located on the front surface of the display module 150 may be further included to fix the audio output unit 160. To output surrounding sound, a pair of front frames 224 may be provided on the left and right sides, as illustrated in FIG. 4. When a woofer is also provided, an additional audio output unit 160 may be disposed in a lower center.

In the case of music listening only through the audio output unit 160, an icon or information required for listening to music may be output to the second area during music listening in the basic mode in which the display module 150 is inserted as illustrated in FIG. 2. For example, the title of music being played and the name of a singer may be displayed, or a cover image of an album may be displayed in the second area.

When the display module 150 is extended to the maximum as illustrated in FIG. 3, it may be moved to suit the user's eye level, and the size of a screen exposed to the outside may vary depending on a screen size required according to the ratio of a displayed screen.

Figure 5:
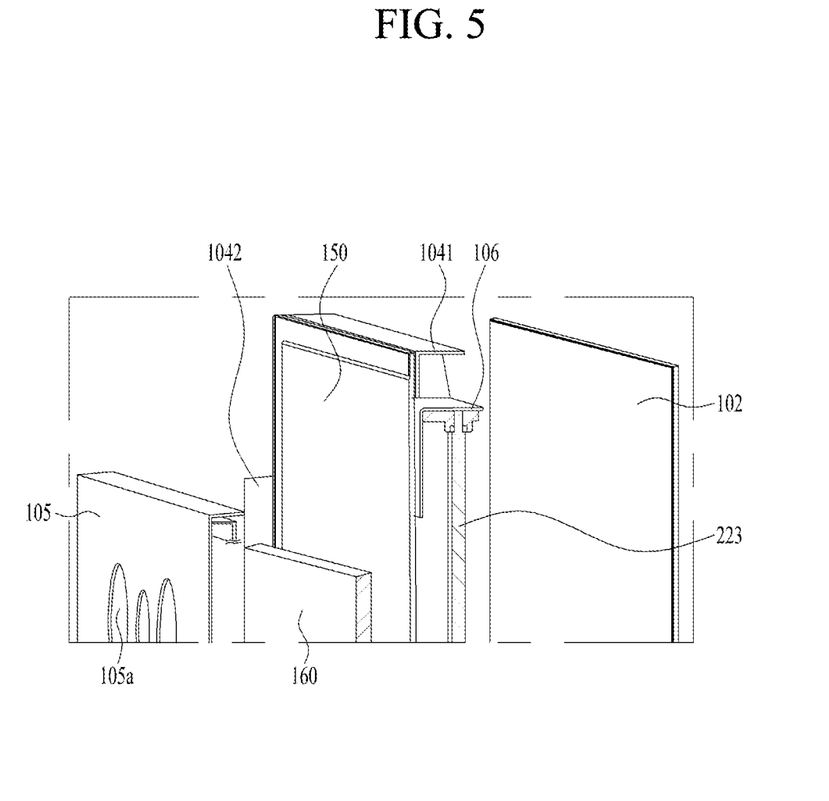
FIG. 5 is a front view illustrating the display device with a front cover removed therefrom according to the disclosure.

FIG. 5 is an exploded view illustrating a cross-section of the display device 100 according to the disclosure, taken along line A-A' of FIG. 2, in which the audio output unit 160 may be located between the front cover 105 and the display module 150. An electronic component such as a circuit board and a driving IC may be mounted between the display module 150 and the rear cover 102, as a controller that controls the display module 150 and the audio output unit 160.

The side cover 104 may be further included to secure a mounting space on the rear surface of the display module 150. The side cover 104 may be located on the rear surface of the display module 150, and include a top cover 1041 located on top of the rear cover 102 and lateral covers 1042 located on the left and right sides of the display module 150.

The top cover 1041 and the lateral covers 1042 form the exterior of the display device 100, together with the front cover 105 and the rear cover 102. The top cover 1041 and the lateral covers 1042 may be integrally formed or may be formed by connecting straight covers.

The top cover 1041 is located only on a portion of the rear surface of the display module 150, and thus has a small width. The lateral covers 1042 may have a rear-direction length corresponding to the size of the rear cover 102, and a front-direction length corresponding to the size of the front cover 105, and thus have a step at the top thereof, as illustrated in FIG. 2.

Figure 6:
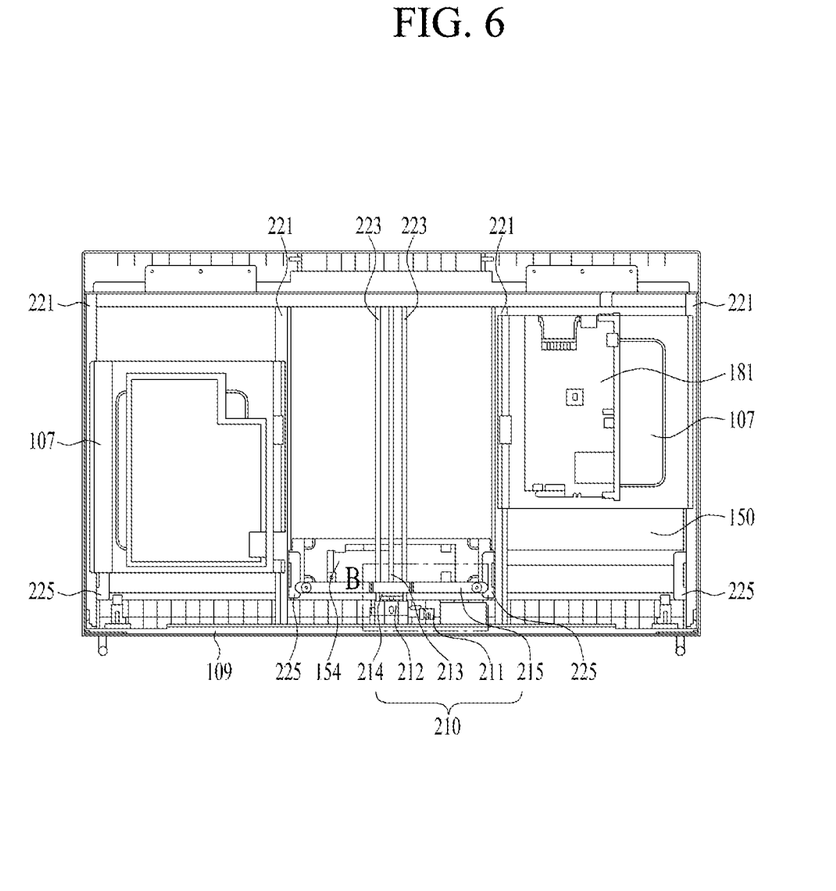
FIGS. 6 and 7 are rear views illustrating the display device with a rear cover removed therefrom according to the disclosure.
Figure 7:
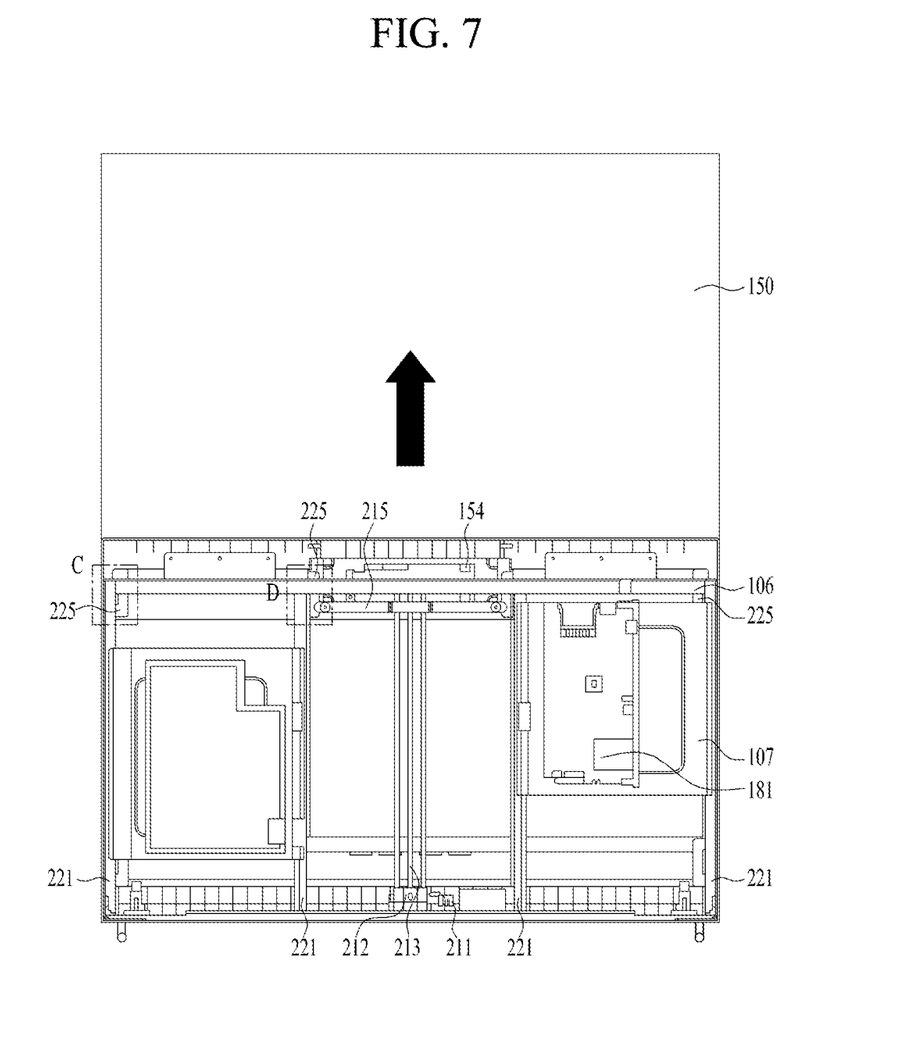
Figure 8:
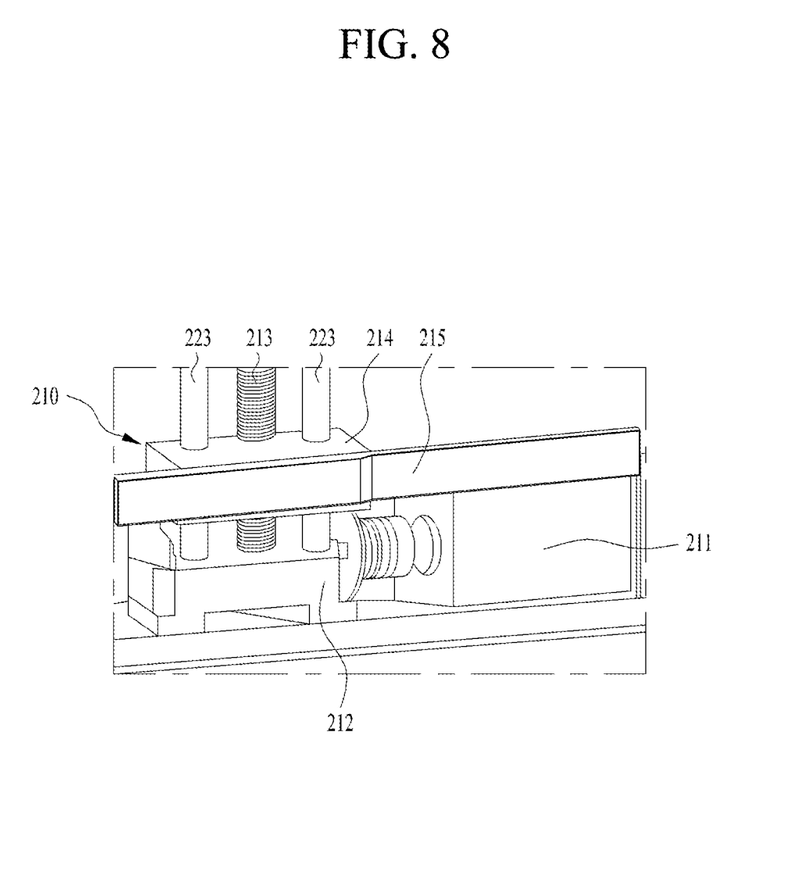
FIG. 8 is a diagram illustrating a driver in the display device according to the disclosure.

A driver 210 is located between the display module 150 and the rear cover 102, which will be described in more detail with reference to FIGS. 6 and 7. FIGS. 6 and 7 are rear views illustrating the display device 100 with the rear cover 102 removed therefrom according to the disclosure, and FIG. 8 is an enlarged view illustrating a portion B of FIG. 6.

The driver 210 may include a motor 211 that moves the display module 150 upward and downward and provides power, a lead screw 213 that rotates by receiving the power from the motor 211, a nut that moves up and down along the lead screw 213, and a moving bracket 215 that fastens the display module 150 with the nut.

When a single driver 210 is provided as illustrated in FIG. 6, the driver 210 may be disposed at a center, for balance. A plurality of drivers 210 may be provided. In this case, the drivers 210 may be arranged to be spaced apart from each other by a predetermined distance.

The lead screw 213, which is a bar-shaped member with a spiral formed on an outer side thereof, may be disposed vertically in the rear direction of the display module 150, as illustrated in FIG. 6.

The lead screw 213 has a length corresponding to a driving distance of the display module 150. Since the driving distance of the display module 150 is smaller than the height of the rear cover 102, the lead screw 213 may be disposed at a predetermined distance apart from the top and bottom of the rear cover 102. Even in the extended mode, the driver 210 should be located on the rear surface of the display module 150. Accordingly, a top end of the lead screw 213 may be located above a top end of the front cover 105.

When the lead screw 213 rotates, the nut 214 through which the lead screw 213 passes may move upward and downward, and may be fastened to the display module 150 through the moving bracket 215. The moving bracket 215 may have a bar shape extending horizontally to uniformly transmit power from the driver 210 located at the center to the display module 150.

When a rotation axis of the motor 211 is disposed in the same direction as the lead screw 213, a vertical length of the display device 100 increases. To prevent the vertical size of the display device 100 from increasing, the motor 211 may be disposed in a horizontal direction as illustrated in FIG. 8, and include a connecting gear 212 such as a bevel gear or a worm gear to change the direction of rotation.

The moving bracket 215 is fastened to the nut 214 at a center thereof, and coupled with the display module 150 at both ends thereof. When the nut 214 moves upward and downward through the moving bracket 215, the display module 150 may also move upward and downward.

Because the driver 210 is switched to linear movement using a rotational force of the motor 211, the driver 210 may further include a guide shaft 223 disposed in parallel with the lead screw 213 as illustrated in FIG. 8, so that when the lead screw 213 rotates, the nut 214 only moves upward and downward without rotating.

A single guide shaft 223 may be provided, or a pair of guide shafts 223 may be provided on both sides of the lead screw 213 in parallel with the lead screw 213. The nut 214 may further include a hole through which the guide shaft 223 passes in addition to a hole through which the lead screw 213 passes. Although a spiral corresponding to the spiral of the lead screw 213 is formed on an inner side of the hole of the nut 214 through which the lead screw 213 passes, the guide hole through which the guide shaft 223 passes may have a smooth surface.

A support frame 221 is a bar-shaped member extending in the vertical direction and supports a vertical force of the display device 100. Particularly, with the display module 150 moved upward, the support frame 221 may reinforce a supporting force to a vertical load of the display module 150.

The support frame 221 may not only reinforce the supporting force of the display device 100, but also guide the display module 150 to move upward and downward stably without shaking, when the display module 150 moves upward and downward.

A moving block 225 coupled with the rear surface of the display module 150 may be slidably coupled with the support frame 221. The moving block 225 may move upward and downward along the support frame 221, while being limited in its lateral movement, thereby guiding the vertical movement of the display module 150.

A plurality of support frames 221 may be arranged in the horizontal direction. A support frame located in the middle may be installed at the same position as the front frame 224 described above to be integrally formed, and the display module may be disposed between them.

A plurality of moving blocks 225 may be disposed on the rear surface of the display module 150 at predetermined intervals in the horizontal direction. The moving bracket 215 may be directly fastened to the rear surface of the display module 150, or may be coupled with the display module 150 through the moving blocks 225 as illustrated in FIG. 6.

Figure 9:
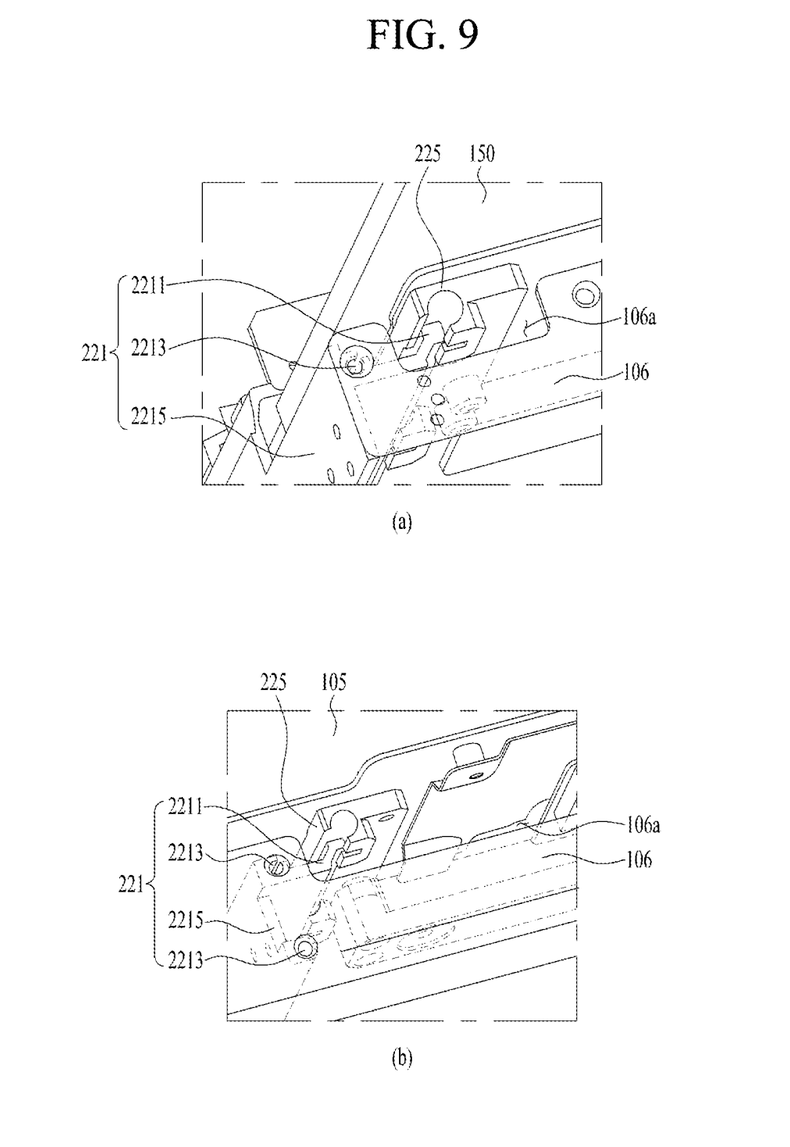
FIG. 9 is a diagram illustrating a support frame and a moving block in the display device according to the disclosure.

FIG. 9 is a diagram illustrating the support frame 221 and the moving block 225 in the display device 100 of the disclosure. FIG. 9(a) illustrates a part C of FIG. 7, and FIG. 9(b) illustrates a part D of FIG. 7.

FIG. 9(a) is a diagram illustrating coupling between a support frame 221 and a moving block 225, which are located at a lateral end of the display device 100, and FIG. 9(b) is a diagram illustrating a support frame 221 and a moving block 225, which are located in the middle of the display device 100.

The support frame 221 may have a ㄱ-shape and include a first frame 2211 coupled with the moving block 225 and a second frame 2215 disposed perpendicular to the first frame 2211. The angle between the first frame 2211 and the second frame 2215 is not necessarily 90 degrees, and the two members at a predetermined angle to increase rigidity compared to a volume.

The support frame 221 may be disposed at a predetermined distance from the display module 150 so as not to interfere with the display module 150, when the display module 150 moves upward and downward. At this time, it is difficult to dispose the first frame 2211 horizontally in parallel with the moving block 225. Therefore, as illustrated in FIG. 9, an end of the first frame 2211 may be bent in the front direction and fastened to the moving block 225.

The end of the first frame 2211 may have a rail shape to prevent the moving block 225 from being separated, and the moving block 225 may include a groove portion surrounding the end of the first frame 2211 to move upward and downward, while remaining fastened to the first frame 2211.

The bottom of the support frame 221 is fastened to a lower frame 109. The top of the support frame 221 may be fastened to the top cover 1041. However, since the top cover 1041 is a part exposed to the outside, a horizontal frame 106 located inside the top cover 1041 may be further included. The horizontal frame 106 may support horizontal rigidity together with the lower frame, and ends of the support frame 221, the lead screw 213, and the guide shaft 223 may be fastened to the horizontal frame 106.

To fasten the support frame 221 through a screw, a screw hole 2213 should be machined in the support frame 221. However, as illustrated in FIG. 9, the screw hole 2213 may be formed during extrusion molding, which obviates the need for separate laser processing.

Although the screw hole 2213 may not be extruded in a closed form, it may be extruded in a form in which one side is open. The lower frame 109 and the horizontal frame 106 may be fastened to both ends of the support frame 221 using screws.

A lateral cover (not shown) may be coupled with the second frame 2215 of the support frame 221 located at the horizontal end of the display module 150 to form the exterior of the display device 100.

Since the horizontal frame 106 may interfere with the moving block 225 when the display module 150 moves upward and thus is placed in the extended mode, the moving block 225 may be concave, as indicated by reference numeral 106a in FIG. 9.

In addition, a display IC located on the rear surface of the display module 150 is also a component protruding from the rear surface of the display module 150. To avoid interference between the display IC 154 and the horizontal frame 106, the horizontal frame 106 may have a groove 106a formed in a portion corresponding to the display IC 154.

The display device of the disclosure may be used by extending the display module to the outside only when needed, thereby minimizing exposure of a black screen on the display module to the outside at normal times.

In addition, there is a structure that supports the rear surface of the display module 150 in the extended state of the display module 150, thereby preventing the display module from being damaged.

The above detailed description should not be construed as being limitative in all terms, but should be considered as being illustrative. The scope of the disclosure should be determined by reasonable analysis of the accompanying claims, and all changes in the equivalent range of the disclosure are included in the scope of the disclosure.

The invention claimed is:

1. A display device comprising:
   a housing including a first opening formed on top thereof;
   a display module passing through the first opening, and including a first area located inside the housing and a second area located outside the housing;
   a driver vertically sliding the display module; and
   a controller controlling the driver to switch between a basic mode and an extended mode,
   wherein the housing includes:
   a front cover located at a front of the display module; and
   a rear cover located at a rear of the display module and having a height greater than a height of the front cover, and
   wherein the second area is minimized in the basic mode and increases when the display module moves upward to switch to the extended mode, and
   wherein an upper portion of the rear cover protruding higher than the front cover is located at a rear of the second area of the display module located outside the housing in both the basic mode and the extended mode.

2. The display device of claim 1, wherein the display module includes:
   a display panel on which an image is output;
   a flexible substrate extending from a bottom of the display panel and bent in a rear direction; and
   a display controller connected to the flexible substrate and located under a rear surface of the display panel, and
   wherein the rear cover has a size corresponding to heights of the flexible substrate and the display controller located under the display module.

3. The display device of claim 1, wherein the display module further includes a display panel and a back plate covering the rear surface of the display panel.

4. The display device of claim 1, wherein the basic mode in which the second area of the display module has a size corresponding to a size difference between the rear cover and the front cover.

5. The display device of claim 1, wherein the front cover includes at least one second opening located on a front surface thereof, and
    wherein the controller controls the display module to emit light or an image through the second opening in the basic mode.

6. The display device of claim 1, wherein the driver includes:
    a motor providing a rotational force;
    a lead screw rotating by receiving the rotational force of the motor;
    a nut moving upward and downward along the lead screw; and
    a moving bracket fastening the nut to the display module.

7. The display device of claim 6, wherein the driver further includes a guide shaft located in a lateral direction of the lead screw, extending parallel to the lead screw, and penetrating the nut.

8. The display device of claim 6, comprising:
    a support frame extending in a vertical direction; and
    a moving block coupled with the rear surface of the display module and moving upward and downward along the support frame,
        wherein the moving bracket is fastened to the moving block.

9. The display device of claim 8, wherein a plurality of moving blocks and a plurality of support frames are arranged in a horizontal direction, and
    wherein the support frames are located at both horizontal ends of the display module from side surfaces of the housing.

10. The display device of claim 8, wherein the support frame includes:
    a first frame parallel to the display module and having an end fastened to the moving block; and
    a second frame perpendicular to the first frame.

11. The display device of claim 10, further comprising:
    a horizontal frame coupled with a top end of the support frame; and
    a lower frame forming a bottom surface of the housing, and coupled with a bottom end of the support frame.

12. The display device of claim 1, wherein the housing includes a side cover located around a periphery of a front surface of the rear cover and forming a side exterior of the housing.

13. The display device of claim 1, further comprising an audio output unit located between the front cover and the display module,
    wherein the display device comprises a second opening located on a front surface of the front cover and allowing sound output from the audio output unit to pass therethrough.

14. The display device of claim 1, wherein the housing includes a lateral cover located on left and right sides of the display module and between the front cover and the rear cover, and
    wherein the lateral cover has a stepped configuration at a top thereof corresponding to a height difference between the front cover and the rear cover.

15. The display device of claim 14, wherein the housing includes a top cover located at the top of the rear cover and forming an upper exterior to cover between the display module and the rear cover.

16. A display device comprising:
    a housing including a first opening formed on top thereof;
    a display module passing through the first opening, and including a first area located inside the housing and a second area located outside the housing;
    a driver vertically sliding the display module; and
    a controller controlling the driver to switch between a basic mode and an extended mode,
    wherein the housing includes:
    a front cover located at a front of the display module; and
    a rear cover located at a rear of the display module and having a height greater than a height of the front cover, and
    wherein the second area of the display module in the basic mode has a size corresponding to a height difference between the rear cover and the front cover, and
    wherein the second area increases when the display module moves upward to switch to the extended mode.

17. A display device comprising:
    a housing including a first opening formed on top thereof;
    a display module passing through the first opening, and including a first area located inside the housing and a second area located outside the housing;
    a driver vertically sliding the display module; and
    a controller controlling the driver to switch between a basic mode and an extended mode,
    wherein the housing includes:
    a front cover located at a front of the display module;
    a rear cover located at a rear of the display module and having a height greater than a height of the front cover; and
    a lateral cover located at left and right sides of the display module and between the front cover and the rear cover, and
    wherein the lateral cover has a stepped configuration at a top thereof corresponding to a height difference between the front cover and the rear cover.

* * * * *